United States Patent [19]

Wagener et al.

[11] 4,262,114
[45] Apr. 14, 1981

[54] SEGMENTED THERMOPLASTIC COPOLYESTERS

[75] Inventors: Kenneth B. Wagener; David A. Johnson, both of Asheville, N.C.

[73] Assignee: Akzona Incorporated, Asheville, N.C.

[21] Appl. No.: 752,587

[22] Filed: Dec. 20, 1976

[51] Int. Cl.³ .............................................. C08L 67/02
[52] U.S. Cl. ...................................... 528/301; 525/94
[58] Field of Search ....................... 260/860, 868, 75 N; 528/289, 290, 291, 301

[56] References Cited

U.S. PATENT DOCUMENTS

| 3,856,754 | 12/1974 | Habermeier et al. | 260/75 N |
|---|---|---|---|
| 3,886,123 | 12/1974 | Habermeier et al. | 260/75 N |
| 3,937,753 | 2/1976 | Hahn et al. | 260/75 N |
| 3,937,755 | 2/1976 | Hahn et al. | 260/860 |
| 4,122,072 | 10/1978 | Lawton | 528/289 |

Primary Examiner—Harold D. Anderson
Assistant Examiner—Amelia B. Yarbrough
Attorney, Agent, or Firm—Francis W. Young; Jack H. Hall

[57] ABSTRACT

This invention relates to polyester polyether segmented copolymers wherein the polyether segment contains a certain amount of heterocyclic ring repeat units, for example, the hydantoin ring. These polyester polyether segmented copolymers are useful in the production of fibers, films or other extrusion moldings where elastomeric properties are desirable.

31 Claims, No Drawings

SEGMENTED THERMOPLASTIC COPOLYESTERS

BACKGROUND OF THE INVENTION

In the textile and allied fields where elastomeric properties are desired in certain products and end uses, rubber has long been used. For many applications, natural or synthetic rubber falls short because of undesirable aesthetics or insufficient physical properties. In many instances it must be covered with other materials, natural or synthetic, for use in garments. Therefore much effort has gone into the development of materials which have the desirable elastic properties of rubber but not the undesirable aesthetic or physical properties mentioned above. Much of this work has evolved around the incorporation of long-chain "soft segments" into polymers made up of varying proportions of more easily crystallized thermoplastic "hard segments", resulting in segmented copolymers which are thermoplastic, elastomeric, and capable of being extruded into filaments, fibers or other desired shapes.

Charch and Shivers reported the use of polyester ether condensation block copolymers ("Part II; Elastomeric Condensation Block Copolymers", Charch and Shivers, *Textile Research Journal,* 1959, p. 536.) which are capable of being shaped into fibers, their compositions being based primarily on the use of poly (oxyethylene oxyterephthalogyl) as the hard segment and poly (oxyethylene) as the soft segment. The low glass transition temperature, resultant extensibility, reactive difunctionality and economy explain this soft segment's extensive use in various other studies; however, its susceptability to room temperature recrystallization at high molecular weights, even as part of a block copolymer, adversely effects elastic properties and limits useful molecular weights to less than 1500.

In constructing segmented copolymers which have sufficiently rapid hardening rates to allow satisfactory handling after extrusion, it has been found necessary to have certain percentages of specific dicarboxylic acids in the hard and soft segments and certain percentages of specific low molecular weight diols in the hard segment. For instance it is reported essential in U.S. Pat. No. 3,763,109 that at least about 70 mole % of the dicarboxylic acid in the polymer be terephthalic acid and at least about 70 mole % of the low molecular weight diol in the polymer be 1,4-butane diol. Also, at least about 70 mole % of the low molecular weight diol in the hard segment must be 1,4-butane diol. Further the sum of the percentages of the carboxylic acid in the hard and soft segments which is not terephthalic acid and the low molecular weight diol in the hard segment which is not 1,4-butane diol can not exceed about 30 mole %. Copolyesters having fewer 1,4-butylene terephthalate units than assured by the foregoing requirements do not have sufficiently rapid hardening rates for satisfactory handling after extrusion.

SUMMARY OF THE INVENTION

According to the present invention there is provided a thermoplastic segmented copolyester polyether consisting essentially of a multiplicity of randomly occurring intrachain segments of long-chain (soft segments) and short-chain (hard segments) ester units, said long-chain ester units being represented by the following structure:

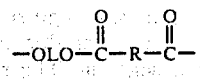

where L is a divalent radical remaining after removal of terminal hydroxyl groups from poly (oxyalkylene) glycols having at least 1 nitrogen containing ring per molecule, a carbon to nitrogen ratio of from about 3/1 to about 350/1, and a molecular weight between 200 and 8,000, and R is a divalent radical remaining after the removal of the carboxyl groups from a dicarboxylic acid having a molecular weight of less than 300.

Short-chain ester units are represented by the following structure:

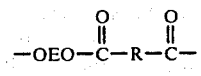

where E is a divalent radical remaining after removal of hydroxyl groups from a low molecular weight diol having 2 to 15 carbon atoms per molecule and a molecular weight between 50 and 250, and R is the divalent radical described for (a) above.

The introduction of a foreign repeat unit in the backbone of a crystallizable soft segment, such as a polyether, has an effect on the soft segment crystallization process. Such a foreign unit must be stable to processing temperatures and must not be so rigid as to reduce the mobility (raise the glass transition temperature) of the soft segment itself. The foreign unit should be nonreactive during the synthesis of the segmented thermoplastic elastomer and should be present in the concentration of at least 1 unit per polyether molecule. The long-chain ester unit, or soft segment, of the elastomeric copolymer is preferably about 40–70% by weight of the copolyester.

The polyether soft segment of the present invention may be represented by the following structures:

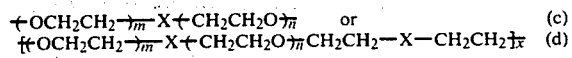

In (c), the unit X is placed near the center of the polyether chain and may be one foreign unit or a series of foreign units covalently linked together. In (d), the unit X is one or more foreign repeat units as in (c) but these units are placed along the length of the linear polyether chain.

In both formulas (c) and (d), X is a nitrogen containing heterocyclic ring giving the polyether soft segment a carbon to nitrogen ratio of from about 3/1 to about 350/1 and a molecular weight between 200 and 8,000. The sum of m plus n is within the range of 5 to 180, and x in formula (d) has a maximum value of 10.

The nature of X is such that it may covalently enter the polyether chain to influence crystallization. Covalent links to the polyether in (c) or (d) may be the amide link or the imide link, both of which are capable of withstanding high temperature processing. These links, the polyester units themselves, and the foreign unit(s) X in (c) or (d) form the soft segment.

The introduction of the repeat unit X into the poly(oxyethylene) chain, where X is greatly different from poly(oxyethylene), disrupts chain regularity and suppresses the melting point of the soft segment preventing crystallization at room temperature. This allows the use of higher molecular weight polyethers, or stated differently, lower mole percentage of the soft segment. The lower mole percentage of soft segment increases the melting point of the copolymer due to higher mole percentage of the hard segment. The ratio of weight percent of the short chain ester units to long-chain ester units is preferably between 60 to 40 and 30 to 70. Also a more regular chain is obtained which may result in better separation of the hard and soft phases. Better phase separation results in a higher tenacity, a lower glass transition temperature for the soft segment and an improved elastomeric performance.

DETAILED DESCRIPTION

The term "foreign repeat unit" as applied to the soft segments of this invention refers to heterocyclic, nitrogen containing, rings which may covalently link (as amide or imide) along the soft segment chain as described previously. Representative units are: 1,3-divalent-5,5-dialkylhydantoin (including alkyl groups connected in a cyclic fashion to the 5,5 positions); 2,5-divalent-1,3,4-triazole; 2,5-divalent-1,3,4-oxadiozole; 2,-5-divalent-1,3,4-thiadiazole; 1,3-divalent-1,2,4-triazolidine-3,5-dione; 4,5-divalent-1,2-isothiazole; 4,5-divalent-1,2-oxazole; 4,5-divalent-1,3-diazole; 2,5-divalent-1,3-oxazole; 2,4-divalent-imidazole; divalent (N position) hypoxanthine; and 2,5-divalent-1,3-thiazole.

The term "long-chain ester units" as applied to units in the copolymer chain refers to the reaction product of a long-chain glycol with a dicarboxylic acid. Such "long-chain ester units", which are repeating units in the copolyesters of this invention, correspond to formula (a) above. The long-chain glycols are polymeric glycols having terminal hydroxy groups and a molecular weight above about 400 and preferably about 1,000 to 3,000 for (c). The long-chain glycol used to prepare the copolyesters of this invention are poly(oxyalkylene) glycols having foreign repeat units represented by formulas (e) and (f).

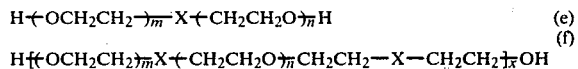

$$H+OCH_2CH_2\!\!\!\xrightarrow{}_{\overline{m}}X+CH_2CH_2O\!\!\!\xrightarrow{}_{\overline{n}}H \qquad (e)$$

$$H+OCH_2CH_2\!\!\!\xrightarrow{}_{\overline{m}}X+CH_2CH_2O\!\!\!\xrightarrow{}_{\overline{n}}CH_2CH_2-X-CH_2CH_2\!\!\!\xrightarrow{}_{\overline{x}}OH \qquad (f)$$

These poly(oxyalkylene) glycols have carbon to nitrogen ratios between about 3/1 and about 350/1, molecular weights between 200 and 8,000, m plus n is within the range of 5 to 180, and x in formula (f) has a maximum value of 10. In a preferred embodiment, the poly (oxyalkylene) glycols have carbon to nitrogen ratios between about 8.5/1 and about 23/1 and molecular weights between 450 and 8,000. Representative long-chain glycols are poly(oxyethylene) glycol, poly(oxypropylene)glycol, poly(oxymethylethylene) glycol, poly(oxytetramethylene) glycol, and coolymers of ethylene oxide and 1,2-propylene oxide.

The term "short-chain ester units" as applied to units in the copolymer chain refers to low molecular weight compounds for polymer chain units having molecular weights less than about 500. They are made by reacting a low molecular weight diol (below about 250) with a dicarboxylic acid to form ester units represented by formula (b) above.

Included among the low molecular weight diols which react to form the short-chain ester units are a cyclic, alicyclic, and aromatic dihydroxy compounds. Preferred are diols with 2 to 15 carbon atoms such as ethylene, propylene, 1,4-butane, pentamethylene, 2,2-dimethyl trimethylene, hexamethylene, and decamethylene glycol, dihydroxycyclohexane, cyclohexane dimethanol, resorcinol, hydroquinone, 1,5-dihydroxy naphthaline, etc. Especially preferred are aliphatic diols containing 2 to 8 carbon atoms. Equivalent ester-forming derivatives of diols are also useful (e.g. ethylene oxide or ethylene carbonate can be used in place of ethylene glycol). The term "low molecular weight diols" as used herein should be construed to include such equivalent ester-forming derivatives; provided however, that the molecular weight requirement pertains to diol only and not to its derivatives.

Dicarboxylic acids which are reacted with the foregoing long-chain glycols (L in formula a) and low molecular weight diols (E in formula b) to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of carboxylic acids having 2 functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester of ester-forming derivative. Thus, an ester of a dicarboxylic acid having a molecular weight greater than 300 or an acid equivalent of a dicarboxylic acid having a molecular weight greater than 300 are included provided the corresponding acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to the carboxylic acids having 2 carboxyl groups each attached to a saturated carbon atom. If the carbon atom to which the carboxylic acid group is attached is saturated and is in a ring, the acid is cycloaliphatic. Aliphatic or cycloaliphatic acids having conjugated unsaturation often can be used provided they are thermally stable at polymerization temperatures and do not undergo homopolymerization.

Aromatic dicarboxylic acids, as the term is used herein, are dicarboxylic acids having 2 carboxyl groups attached to a carbon atom in an isolated or fused benzene ring. It is not necessary that both functional carboxyl groups be attached to the same aromatic ring and where more than 1 ring is present, they can be joined by aliphatic or aromatic divalent radicals or divalent radicals such as —O— or —SO₂—.

Representative aliphatic and cycloaliphatic acids which can be used for this invention are sebasic acid, 1,3-cyclohexane dicarboxylic acid, 1,4-cyclohexane dicarboxylic acid, adipic acid, glutaric acid, succinic acid, carbonic acid, oxalic acid, azelaic acid, dimethylmalonic acid, allylmalonic acid, 4-cyclohexene-1,2-dicarboxylic acid, 2-ethyl suberic acid, 2,2,3,3-tetramethyl succinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene bis (cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, dibenzoic acid, substituted dicarboxylic acids with two benzene nuclei such as Bis (p-carboxyphenyl) methane, p-oxy(p-carboxyphenyl) benzoic acid, ethylene-Bis (p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$alkyl and ring substitution derivatives thereof, such as halo, alkoxy, and aryl derivatives. Hydroxy acids such as ($\beta$-hydroxy ethoxy) benzoic acid can also be used provided an aromatic dicarboxylic acid is also present.

Aromatic dicarboxylic acids are a preferred class for preparing the copolester polymers of this invention. Among the aromatic acids, those with 8 to 16 carbon atoms are preferred, particularly the phenylene dicarboxylic acids, i.e., terephthalic, phthalic and isphthalic acids.

Polymers described herein can be made conveniently by a conventional ester interchange reaction such as that described in detail to U.S. Pat. No. 3,763,109. Other special polymerization techniques, for example interfacial polymerization, may prove useful for preparation of specific polymers. Both batch and continuous methods may be used for any stage of copolyester polymer preparation. Polycondensation of prepolymers can also be accomplished in the solid phase by heating divided solid prepolymer in a vacuum or in a stream of inert gas to remove liberated low molecular weight diol. This method has the advantage or reducing degradation because it must be used at temperatures below the softening point of the prepolymer.

Although the copolyesters of this invention possess many desirable properties it is advisable to stabilize certain of the compositions to heat or ultraviolet radiation, and this can be done by incorporating stabilizers into the polyester compositions. Satisfactory stabilizers comprise phenols and their derivatives, amines and their derivatives, compounds containing both hydroxyl and amine groups, hydroxyazine, oximes, polymeric phenolic esters and salts of multivalent metals in which the metal is in its lower valent state.

The properties of these copolyesters can be modified by the incorporation of various conventional inorganic compounds such as titanium dioxide, carbon black, silica gel, alumina, clays, and chopped fiberglass.

All parts, proportions, and percentages disclosed herein are by weight unless otherwise indicated. The following examples further illustrate the invention.

EXAMPLES

The following ASTM methods are employed in determining the properties of the polymers prepared in the examples which follow. All methods are carried out at 65° C. and 60 RH rather than 70° C. and 65 RH specified by ASTM.

| Tenacity at Break | D2657-72 |
| Elongation at Break | D2657-72 |
| Stress Decay | D2731-72 |
| Tensile Recovery | D2731-72 |

Relative viscosity is determined in three different solution concentrations, 1% and less, of polymer in solvent consisting of 60 parts by weight of phenol and 40 parts by weight of tetrachloroethane in a Ubbelohde viscometer at 25°±1° C. The intrinsic viscosity is then determined as the intercept of a plot of $$\frac{nrel - 1}{\text{concentration}} \text{ vs concentration in g/dl.}$$

Thermal data was collected on a DuPont 990 termal analysis system using the differential thermal analysis cell and the differential scanning calorimeter cell.

EXAMPLE 1

The segmented copolymers of this invention may be prepared using prepolymers represented by formula (c), one example of which is Dantocol DHE-20, with a molecular weight of 1,000 and available from Glyco Chemical Company. Other such prepolymers are available with molecular weights of 400 to 2500. The prepolymer is prepared generally according to procedures disclosed in British Pat. No. 1,260,972. For example, 128 g (1 mole) 5,5-dimethylhydantoin may be melted at 200° C. in a round flask fitted with a stirrer and gas inlet and outlet tubes. The melt is stirred vigorously while ethylene oxide is introduced for 2 hours resulting in a weight gain of 88 g (2 mole ethylene oxide). The temperature is gradually reduced to 120° C. and the product is fractionally distilled under vacuum, the major fraction distilling at 205° C. to 210° C. at 1.5 mm mercury. The product is allowed to crystallize and is purified by recrystallization from isopropyl alcohol with the addition of petroleum ether. Further ethoxylation of the 1,3-di($\beta$-hydroxyethyl)-5,5-dimethylhydantoin is achieved by the addition of ethylene oxide under pressure in the presence of a basic catalyst such as NaOH.

EXAMPLE 2

Another type of polyether prepolymer, which is represented by formula (d), may be prepared as follows: Bis-1,3-(2-hydroxyethyl)-5,5-dimethylhydantoin (181 g, 0.82 mole) is placed in a round bottom flask fitted with a reflux condenser, a mechanical stirrer and a dropping funnel containing 207.2 g (about 1.64 mole) thionyl chloride. Benzene (300 ml) is added to the reaction flask, which is then stoppered and the thionyl chloride is added with stirring at such a rate as to complete addition in 2 hours. The reaction mixture is stirred overnight at room temperature, then refluxed at 50° C. until evolution of $SO_2$ and HCL is complete and again cooled to room temperature. The mixture is poured onto 1 kg ice and washed with ether to give an ether solution which in turn is washed, first with water and then with 5% $NaHCO_3$ solution. The ether solution is dried, filtered and the ether removed leaving a liquid residue. The crude product is vacuum distilled at 11 mm mercury with the major portion collected at 195° to 197° C. Redistillation at 2 mm mercury gives the product, Bis-1,3-(2-chloroethyl)-5,5-dimethylhydantoin which melts at 80° C.

To 200 g (0.2 mole) Glyco Chemical's DHE-20 (hydantoin polyether of $\overline{M}_n$ about 1,000) in 200 ml tetrahydrofuran is added 0.4 mole sodium naphthalenide, 200 ml dimethoxyethane and the sodium salt of the hydantoin polyether forms as a precipitate. At this point 34.4 g (0.136 mole) of the Bis-1,3-(2-chloroethyl)-5,5-dimethylhydantoin prepared above is added as a solution in 100 ml tetrahydrofuran. After stirring overnight the tetrahydrofuran and dimethoxyethane solvents are removed by distillation and replaced with 300 ml hexamethyl phosphorus triamide. This mixture is refluxed for 6 hours at 80° to 90° C. under dry nitrogen, cooled to room temperature and 38 g dry methyl alcohol is added, followed by 25.5 g acetic acid as a 5% aqueous solution. Vacuum evaporation is used to remove the water and other low-boiling solvents, followed by vacuum distillation to remove the hexamethylphosphorus triamide. The remaining polymer product is represented by the formula

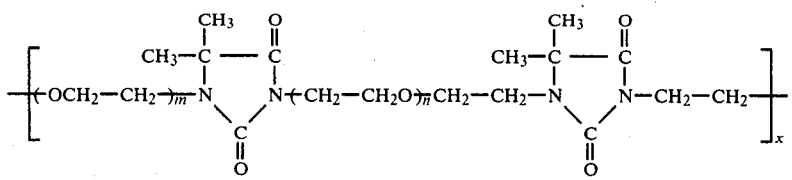

where the sum of m and n is 20 and x is 2. Other variations of this prepolymer may be prepared by using hydantoin polyethers of other or mixed molecular weights instead of the DHE-20 used in this example.

EXAMPLE 3

Synthesis of a segmented copolymer which is 50% by weight hard segment and 50% by weight soft segment is carried out as follows: dimethylterephthalate (200 g, 1.03 moles) and 1,4-butane diol (129.95 g, 1.442 moles) are added to a 1 kg resin kettle equipped with a mechanical stirrer, a nitrogen inlet tube, a thermocouple connected to a Barber-Coleman recorder, and a dual partial condenser of which the lower column is heated to 100° C. by a circulating oil bath and the upper column is heated at 70° C. by a circulating hot water bath. Mounted above the dual partial condenser is an automatic liquid dividing distillation head with a high speed condenser. This system is continuously purged with nitrogen and is heated using a heating mantle at 120° C. Upon reaching this temperature, low speed stirring is started. When the temperature of the reaction mixture reaches 125° C. the catalyst, tetra-butyltitanate (200 mg, 0.10 wt %), is added in 10 ml hexane. The ester interchange reaction begins at 130° to 135° C. and the reaction temperature is increased slowly over a 60-minute period to 160° to 165° C. after which the nitrogen purge is discontinued and a vacuum cycle is started. At this stage at least 80% of the theoretical amount of methanol is distilled. The pressure during the vacuum cycle is reduced very slowly to 175 mm and is maintained at this level for 15 minutes. The pressure is then further reduced to 70 mm for 45 minutes, by which time the theoretical amount of methanol has distilled. At this point the ester interchange product is poured quickly into a 1 kg polymerization kettle containing Ionox 330 (1.0 wt. %) and hydantoin polyester prepolymer of a molecular weight about 1,000) 200 g, 0.20 moles), as prepared and described in Example 1, and the mixture is cooled under a nitrogen blanket to room temperature. Polymerization is started using a Dowtherm boiler to melt the ester interchange product, and when melting is complete a vacuum cycle is started and maintained for 1 hour below 0.1 mm. The polymer is then extruded and quenched in cold water followed by vacuum drying and grinding.

Elemental analysis of the 50/50-hard/soft segment copolymer is given in the following table.

| % Element | Theoretical for 50/50 Copolymer | Found |
|---|---|---|
| Carbon | 59.6 | 61.0 |
| Hydrogen | 7.0 | 7.0 |
| Nitrogen | 1.4 | 1.1 |

Thermal analysis provided the following data:

| Parameter | |
|---|---|
| Melting Range-Hard Segment | 165–180° C. |
| Recrystallization Range | 140–150° C. |
| Heat of Fusion | 43.48 in$^2$/g |
| Glass Transition Temperature | −64° C. |

Molecular weight data regarding this polymer system was gathered by measuring solution viscosities, recording gel permeation chromatography curves, and by analyzing nuclear magnetic resonance spectra.

An average intrinsic viscosity of 1.42 was observed.

Gel permeation chromatography indicates a Gaussian distribution of molecular weights with a polydispersity ratio in the range of 2 to 2.8.

Nuclear magnetic resonance spectra display signals expected for the polymer backbone and allow the calculation of a number average molecular weight for the soft segment. The ratio of the signal generated by the methyl protons at the 5-position of the hydantoin ring (located at 1.37$\delta$) to the signal assigned to the methylenes of the polyether (located at 3.63$\delta$) suggest a number average molecular weight of 1,050, demonstrating the maintenance of the soft segment integrity during polymerization.

Average data from chemical analysis of several preparations as described in this example are given in the following table:

| | Ester Interchange Product | Polycondensation Product |
|---|---|---|
| Methyl Esters, meq/kg | 132 | 3 |
| Acid Number, meq/kg | 28 | 8 |
| % Tetrahydrofuran | 4.4 | 0.11 |
| % Butane diol | 1.3 | 9.5 |

Polymer structural characterization by nuclear magnetic resonance data, and corroborated by chemical thermal analyses described in this example, define the repeat unit structure as expected. The hard and soft segment repeat units are illustrated below along with the assigned chemical shifts.

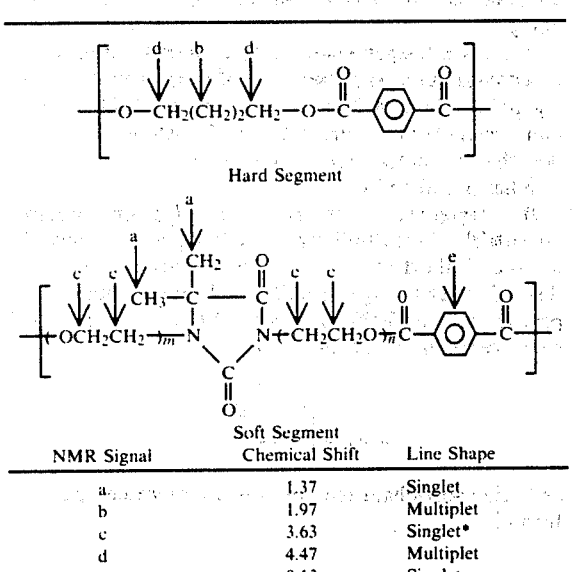

| NMR Signal | Chemical Shift | Line Shape |
|---|---|---|
| a | 1.37 | Singlet |
| b | 1.97 | Multiplet |
| c | 3.63 | Singlet* |
| d | 4.47 | Multiplet |
| e | 8.13 | Singlet |

*This signal is flanked by additional signals of much lower intensity which are assigned to methylenes adjacent to ester groups and to the hydantoin ring.

The dried polymer is melt-spun using a piston driven extruder giving a 6 filament, 100 denier elastic yarn, which is then exposed to one of a variety of heat treatments and/or stressing operations. For example, a sample spun at 1200 mpm exhibited the following physical characteristics after being drawn over a hot pin at 70°–80° C. at a draw ratio of 2.0.

| Tenacity at Break | 1.05 g/d |
|---|---|
| Elongation at Break | 250% |
| Stress Decay | 18.7% |
| Tensile Recovery | 90% |

EXAMPLES 4 THROUGH 10

Copolymer compositions similar to that described in Example 3 and using identical polymer synthesis techniques are prepared with the exception that the molecular weight of the hydantoin-containing segment prepolymer (HPOE) is varied. Thermal properties of the resulting elastomers are given in the following table.

| Example No. | HPOE $\bar{M}_n$ | Copolymer $T_m$ °C. | Copolymer $T_{rc}$ °C. |
|---|---|---|---|
| 4 | 400 | 126 | — |
| 5 | 600 | 159 | 109 |
| 6 | 800 | 172 | 142 |
| 7 | 1000 | 178 | 146 |
| 8 | 1200 | 184 | 151 |
| 9 | 1500 | 195 | 153 |
| 10 | 2000 | 208 | 160 |

EXAMPLES 11 THROUGH 15

Copolymer compositions similar to that described in Example 3 and using identical polymer synthesis techniques are prepared with the exception that the weight percent of the hard segment to the soft segment is varied. Thermal properties of the resulting elastomers are given in the following table.

| Example No. | % Hard:Soft | $T_m$ °C. | $T_{rc}$ °C. |
|---|---|---|---|
| 11 | 60/40 | 208 | 165 |
| 12 | 45/55 | 164 | 108 |
| 13 | 40/60 | 164 | 107 |
| 14 | 35/65 | 158 | 90 |
| 15 | 30/70 | 158 | 90 |

Copolymer compositions similar to those described in Example 3 through 15 may be prepared in like manner except for the hydantoin polyether prepolymer prepared and described in Example 2 may be substituted for that prepared and described in Example 1.

EXAMPLE 16

Dimethyl terephthalate (180 g, 0.927 mole), ethylene glycol (143.8 g, 2.32 mole) and manganese benzoate (89.4 mg, 0.03 mole%) are added to a 1 kg resin kettle equipped as in Example 3. The system is continuously purged with nitrogen and is heated in a heating mantle to 120° C., where stirring is started. When the temperature of the reaction mixture reaches 170° C., methanol is distilled and collected. The mixture is allowed to react for about 70 additional minutes. At this time, 100% of the theoretical amount of methanol has been distilled and the temperature of the reaction mixture is 220° C. The ester interchange product is then cooled to 180° C. where antimony tributyrate (210 ml, 0.05 mole %) and triethylene glycol phosphate (250 ml, 50 ppm) is added. After the ester interchange product cools to 170° C., it is rapidly poured into a 1 kg polymerization kettle containing hydantoin poly (oxyethylene) prepolymer of number average molecular weight about 1000 (120 g, 0.12 mole), and Ionox 330 (1.0 wt.%) as thermal stabalizer. The polycondensation is started using a Dowtherm boiler to melt the ester interchange product, and when melting is complete, a vacuum is started and maintained for 3 hours below 0.1 mm Hg. The polymer is then extruded and has an I.V. of 0.8, a melting point of 220° C. and a temperature of recrystallization of 132° C.

EXAMPLE 17

Dimethyl terephthalate (120 g, 0.62 mole), dimethyl isophthalate (30 g, 0.16 mole), 1,4-cyclohexane dimethanol (156 g, 1.08 mole) and hydantoin polyether (184 g, 0.18 mole) are added to a 1 kg resin kettle equipped as in Example 3. The system is continually purged with nitrogen and is heated with a heating mantle to 120° C. where low speed stirring is started. When the temperature of the reaction mixture reaches 125° C., the catalyst, tetra-butyltitanate (0.16 ml, 0.10 wt %) is added. The ester interchange reaction begins at 190° to 195° C. and when 90% of the theoretical amount of methanol product has been distilled, the ester interchange product is poured into a polymerization vessel containing 1.0 wt % Ionox 330, a thermal stabilizer, and cooled to a room temperature under nitrogen. An additional 0.16 ml of tetra-butyltitanate is added to the polymerization vessel before the ester interchange product is melted using a dimethylphthalate boiler. When the melting is complete, a programmed vacuum cycle is started and maintained for 1 hour and 15 minutes below 0.1 mm Hg. The polymer is then extruded and has an I.V. of 0.74, a $T_m$ of 247° C., and a $T_{rc}$ of 165° C. The polymer is ground, dried and spun into yarn at 275° C. from a hydraulic, piston driven Chemtex spinning apparatus. The undrawn yarn has a denier of 74, a tenacity of 0.63 g/d and an elongation at break of 258%. The yarn is drawn at 400 mpm with draw ratios of 2.0:1 and 3.5:1 and exhibits the following physical properties.

|  | DR 2.0:1 | DR 3.5:1 |
| --- | --- | --- |
| Denier | 28 | 31 |
| Tenacity (g/d) | 1.5 | 1.8 |
| Elongation (%) | 65.5 | 52.9 |
| Stress Decay (%) | | |
| 1st cycle | 52.3 | 50.4 |
| 5th cycle | 39.5 | 37.0 |
| Tensile Recovery (%) | | |
| 1st cycle | 72.0 | 72.0 |
| 5th cycle | 62.0 | 61.0 |

A similar copolyester may be prepared in like manner except dimethylphthalate is substituted for dimethyl isophthalate.

The effect of the foreign unit present in the polyester is best illustrated by preparing two copolymers as described in example III above, one containing a 50% by weight of a hydantoin poly (oxyethylene), HPOE, number average molecular weight about 1200, and one containing 50% by weight of poly (oxyethylene) number average molecular weight about 1300, POE, without the foreign unit, but with a similar number average molecular weight.

Melt spinning each into 50/6 yarn and analysis by differential scanning calorimetry from room temperature to 300° C. shows:

The scan of the POE containing copolymer exhibits an ill-defined endotherm at 48° C. corresponding to the melting point of the soft segment, followed by an endotherm at 156° C. corresponding to the melting point of the hard segment. Cooling the sample results in exotherms at 122° C. and 30° C. corresponding to the recrystallization of the hard and soft segments respectively. When a sample of the POE containing copolymer is annealed at 136° C. for 30 minutes followed by room temperature annealing for 3 days, phase separation apparently is enhanced and thus allows for more efficient crystallization of both segments. This phenomenon is manifested in differential scanning calorimetry endotherms which are more clearly defined than before annealing.

The differential scanning calorimetry scan from room temperature to 300° C. of the HPOE containing copolymer exhibits only one endotherm, a multiplet at about 170° C. which corresponds to the melting point of the hard segment. Cooling the sample to room temperature results in only one exotherm, at 138° C., corresponding to the recrystallization of the hard segment. Even after annealing the sample as above, no melting or recrystallization of the soft segment is observed as evidenced by the lack of a second endotherm or exotherm. The effect is to render the soft segment totally amorphous at or above room temperature, thus allowing for a greater degree of soft segment mobility. Maximum mobility allows maximum elastomeric performance since any crystallization of the soft segment reduces its entropy and thereby reduces the rubber elasticity of these copolymers.

Crystallization of the HPOE containing copolymer can be induced by annealing the sample just below the melting point of the hard segment (160° C. for 15 minutes) followed by annealing of the sample below room temperature (−17° C. for 5 days). A poorly defined endotherm corresponding to the soft segment melting is observed at 5° to 10° C. followed by hard segment melting at 170° C. Recrystallization of the hard and soft segments is observed at 138° C. and −15° C. respectively.

In essence the presence of a foreign unit (for example, a hydantoin unit) has the effect of depressing the melting point of the soft segment from about 48° C. to a more useful temperature in terms of elastomeric properties, that is, below room temperature.

What is claimed is:

1. A segmented thermoplastic copolyester consisting essentially of a multiplicity of recurring long-chain ester units and short-chain ester units joined head to tail through ester linkages, said long-chain ester units comprising from 40–70% by weight of the copolyester and being represented by the formula

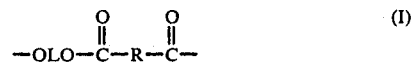

and said short-chain ester units being represented by the formula

where L in said long-chain unit is a divalent radical remaining after removal of terminal hydroxyl groups from a poly(oxyalkylene) glycol having at least one thermally stable hydantoin ring per molecule, each of said rings attached to said chain through amide or imide linkages and giving said radical, L, a carbon to nitrogen ratio between about 3/1 and about 350/1, and a number average molecular weight of between 200 and 8,000; R is a divalent radical remaining after removal of carboxyl groups from a dicarboxylic acid having a molecular weight of less than 300; and E in said short-chain unit is a divalent radical remaining after removal of hydroxyl groups from a low molecular weight diol having 2 to 15 carbon atoms per molecule and a molecular weight less than about 250.

2. The segmented thermoplastic copolyester of claim 1 wherein substantially all of the dicarboxylic acid is terephthalic acid.

3. The segmented thermoplastic copolyester of claim 1 wherein the dicarboxylic acid is about 70–100% terephthalic acid and about 0–30% isophthalic acid.

4. The segmented thermoplastic copolyester of claim 1 wherein the dicarboxylic acid is about 70–100% terephthalic acid and about 0–30% phthalic acid.

5. The segmented thermoplastic copolyester of claim 1 wherein substantially all of the diol having molecular weight less than about 250 is 1,4-butane diol.

6. The segmented copolyester of claim 1 wherein the poly(oxyalkylene) glycol is poly(oxethylene) glycol having a molecular weight of about 400–2500.

7. The segmented copolyester of claim 1 wherein the dicarboxylic acid is 70–100 mole % terephthalic acid, 0–30 mole % isophthalic acid, and 0–30 mole % phthalic acid; the diol having a molecular weight less than 250 is 1,4-butane diol and the poly(oxyalkylene) glycol is poly(oxyethylene) glycol having a molecular weight of about 400–2500.

8. A segmented thermoplastic copolyester consisting essentially of a multiplicity of recurring long-chain ester units and short-chain ester units joined head to tail through ester linkages, said short-chain ester units consisting of the reaction products of cyclic, alicyclic or aromatic low molecular weight diols with aliphatic, cycloaliphatic or aromatic dicarboxylic acids said ester having a number average molecular weight of less than about 500, long-chain ester units comprising from 40-70% by weight of the copolyester and being represented by the formula

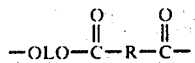

where L is a divalent radical remaining after the removal of terminal hydroxyl groups from poly(oxyalkylene) glycol having at least one thermally stable, hydantoin ring per molecule, each of said rings attached to said chain through amide or imide linkages and giving said radical L, a carbon to nitrogen ratio between about 3/1 and about 350/1, and a molecular weight between 200 and 8,000; and R is a divalent radical remaining after the removal of carboxyl groups from a dicarboxylic acid having a molecular weight of less than 300.

9. The segmented thermoplastic copolyester of claim 8 wherein substantially all of the dicarboxylic acid is terephthalic acid.

10. The segmented thermoplastic copolyester of claim 8 wherein the dicarboxylic acid is about 70-100% terephthalic acid and about 0-30% isophthalic acid.

11. The segmented thermoplastic copolyester of claim 8 wherein the dicarboxylic acid is about 70-100% terephthalic acid and about 0-30% phthalic acid.

12. A segmented thermoplastic copolyester consisting essentially of a multiplicity of recurring long-chain ester units and short-chain ester units joined head to tail through ester linkages, said long-chain ester units comprising from 40-70% by weight of the copolyesters and being represented by the formula

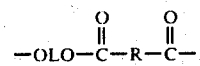 (I)

and said short-chain ester units being represented by the formula

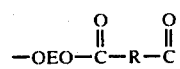 (II)

where L in the long-chain ester unit is a poly(oxyalkylene) glycol unit represented by the formula

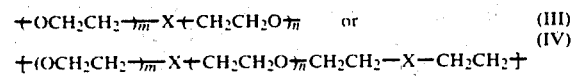 (III) (IV)

and X is 1,3-divalent-5,5-dialkylhydantoin; R is a divalent radical remaining after removal of carboxyl groups from a dicarboxylic acid having a molecular weight of less than 300; E is a divalent radical remaining after removal of hydroxyl groups from a low molecular weight diol having 2-15 carbon atoms per molecule and a molecular weight of less than 250; the sum of m plus n in formula III and IV is within the range of 5 to 180; and x in formula IV has a maximum value of 10.

13. The segmented thermoplastic copolyester of claim 12 wherein substantially all of the dicarboxylic acid is terephthalic acid.

14. The segmented thermoplastic copolyester of claim 12 wherein the dicarboxylic acid is about 70-100% terephthalic acid and about 0-30% isophthalic acid.

15. The segmented thermoplastic copolyester of claim 12 wherein the dicarboxylic acid is about 70-100% terephthalic acid and about 0-30% phthalic acid.

16. The segmented thermoplastic copolyester of claim 12 wherein substantially all of the diol having a molecular weight less than about 250 is 1,4-butane diol.

17. The segmented copolyester of claim 12 wherein the poly(oxyalkylene) glycol unit contains poly(oxyethylene) glycol residues having a number average molecular weight of about 400-2500.

18. The segmented copolyester of claim 12 wherein the dicarboxylic acid is 70-100 mole % terephthalic acid, 0-30 mole % isophthalic acid, and 0-30 mole % phthalic acid; the diol having a molecular weight of less than 250 is 1,4-butane diol and the poly(oxyalkylene) glycol unit contains poly(oxyethylene) glycol residues having a number average molecular weight of about 400-2500.

19. The segmented thermoplastic copolyester of claim 12 where X is

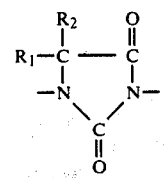

and $R_1$ and $R_2$ are $C_1$ to $C_{12}$ alkyl groups.

20. The segmented thermoplastic copolyester of claim 12 wherein X is

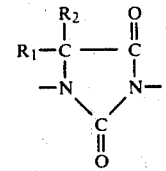

and $R_1$ and $R_2$ are joined to form a $C_5$ or $C_6$ ring structure.

21. The segmented thermoplastic copolyester of claim 12 wherein X is

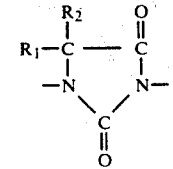

and $R_1$ and $R_2$ are methyl groups.

22. A segmented thermoplastic copolyester consisting essentially of a multiplicity of recurring long-chain ester units and short-chain ester units joined head to tail through ester linkages, said long- and short-chain ester units consisting essentially of divalent radicals remaining after removal of terminal hydroxyl groups from poly(oxyalkylene) glycols and divalent radicals remaining after removal of carboxyl groups from dicarboxylic acids, the improvement comprising incorporating from 40-70% by weight of the copolymer of long-chain ester units each having the formula

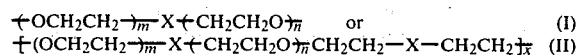
$$+OCH_2CH_2\rangle_{\overline{m}}-X+CH_2CH_2O\rangle_{\overline{n}} \quad \text{or} \quad (I)$$
$$+(OCH_2CH_2)_{\overline{m}}-X+CH_2CH_2O\rangle_{\overline{n}}CH_2CH_2-X-CH_2CH_2\rangle_{\overline{x}} \quad (II)$$

where X is a thermally stable hydantoin ring, each of said rings attached to said long-chain ester unit through amide or imide linkages; m plus n is within the range of 5 to 20; and x in formula II has a maximum value of 10.

23. The segmented thermoplastic copolyester of claim 22 wherein substantially all of the dicarboxylic acid is terephthalic acid.

24. The segmented thermoplastic copolyester of claim 22 wherein the dicarboxylic acid is about 70-100% terephthalic acid and about 0-30% isophthalic acid.

25. The segmented thermoplastic copolyester of claim 22 wherein the dicarboxylic acid is about 70-100% terephthalic acid and about 0-30% phthalic acid.

26. The segmented thermoplastic copolyester of claim 22 wherein substantially all of the diol having a molecular weight of less than about 250 is 1,4-butane diol.

27. The segmented thermoplastic copolyester of claim 22 wherein the poly(oxyalkylene) glycol is poly(oxyethylene) glycol having a number average molecular weight of about 400-2500.

28. The segmented thermoplastic copolyester of claim 22 wherein the dicarboxylic acid is 70-100 mole % terephthalic acid, 0-30 mole % isophthalic acid, and 0-30 mole % phthalic acid; the diol having a molecular weight of less than 250 is 1,4-butane diol and the poly(oxyalkylene) glycol is poly(oxyethylene) glycol having a molecular weight of about 400-2500.

29. The segmented thermoplastic copolyester of claim 1 wherein the ratio of weight percent of the short-chain ester unit to long-chain ester unit is varied between 60 to 40 and 30 to 70.

30. The segmented thermoplastic copolyester of claim 29 wherein substantially all of the dicarboxylic acid is terephthalic acid.

31. The thermoplastic copolyester of claim 29 wherein substantially all of the diol having a molecular weight of less than about 250 is 1,4-butane diol.

* * * * *

UNITED STATES PATENT OFFICE
CERTIFICATE OF CORRECTION

Patent No. 4,262,114        Dated April 14, 1981

Inventor(s) Kenneth B. Wagener and David J. Johnson

It is certified that error appears in the above-identified patent and that said Letters Patent are hereby corrected as shown below:

In Column 2, line 32, change "segement" to --segment--.

In Column 9, lines 10-15, insert the correct formula as follows:

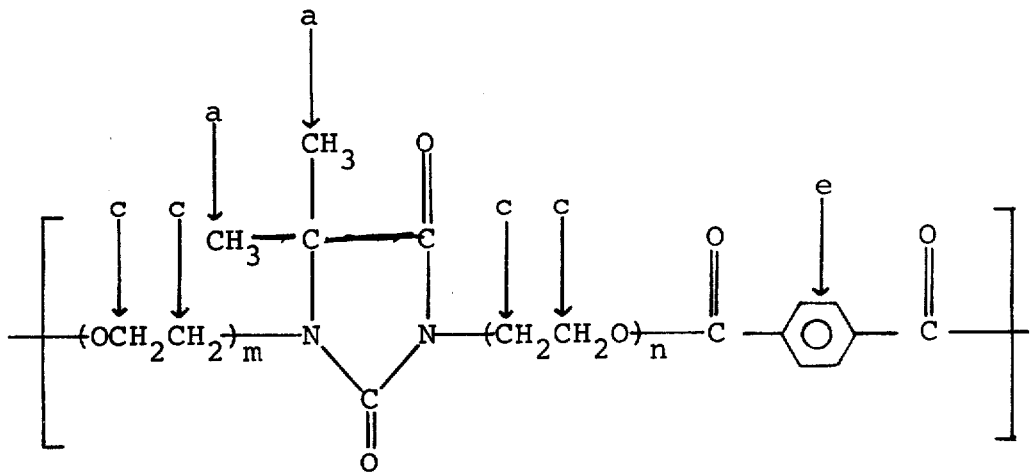

Signed and Sealed this

Third Day of November 1981

[SEAL]

Attest:

GERALD J. MOSSINGHOFF

Attesting Officer    Commissioner of Patents and Trademarks